United States Patent Office 2,886,382
Patented May 12, 1959

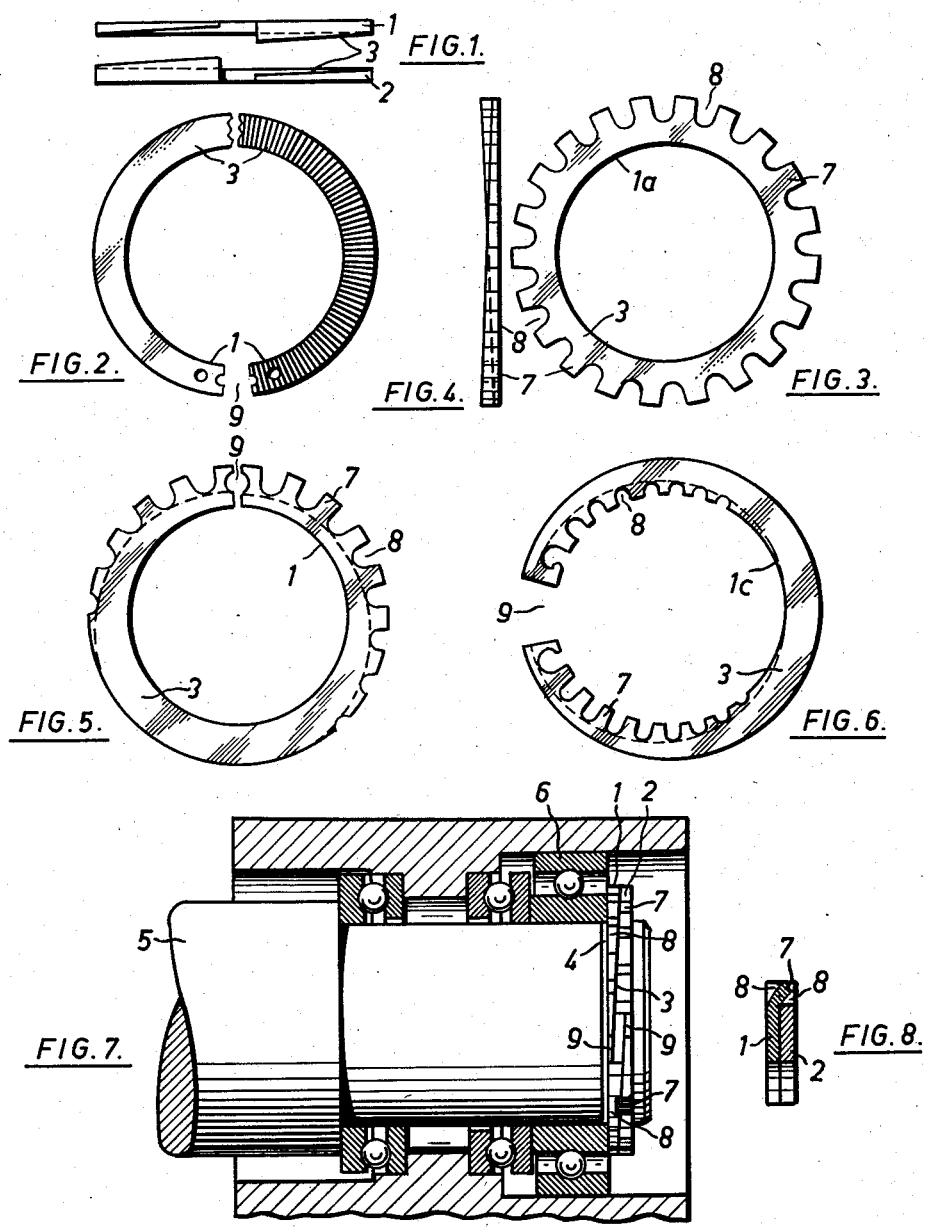

2,886,382
CONTRIVANCE FOR THE LIMITATION OF THE AXIAL PLAY OF SHAFTS

Mikas Baublys, Stuttgart-Bad Cannstatt, Germany

Application May 16, 1957, Serial No. 659,527

Claims priority, application Germany March 16, 1957

10 Claims. (Cl. 308—236)

This invention pertains to a contrivance for the limitation of the axial play of shafts and for the locking in their position of machine parts or the like mounted on the shafts or in bores by means of rings secured in their position against displacement.

There are already known to the art contrivances of this kind consisting of a flat and springy open ring, that is to say, a ring provided with a radially extending open portion, and which is adapted for arrangement in an annular groove of the shaft or the bore. These rings serve as a means for locking the machine parts in their position on a shaft or in a bore. However, with locking rings of this kind the axial play of the shaft can be limited only to a very moderate extent, as these locking rings can not be adapted in thickness to occurring requirements. It may happen, therefore, that the play afforded to the machine parts on the shaft or in the bore as far as the rings is a much too generous one.

Hence, the object of the invention is to adapt the locking ring within certain limits to occurring requirements and to eliminate the axial play either almost completely or to restrict it to the required extent. This is accomplished by the provision of two rings adapted to rest flatly against each other, and whose confronting surfaces are provided with screw surfaces extending in opposite directions, and which when the rings are rotated in ascending direction engage in each other in wedge-like fashion.

The contrivance may be employed either instead of the hitherto customary locking rings or in combination with the latter.

The pitch of the screw surfaces is preferably a very slight one and may extend over the entire side surface of the two rings. But it is also possible to devise the rings in such manner that there are one or several offset portions or breaks in the ascending direction of the pitch.

The oppositely directed screw surfaces of the two rings may either be outwardly roughened or be provided with radially extending grooves, in order to prevent automatic backward slipping of the two rings in the direction opposite to the ascending direction of the two screw surfaces.

If the two rings are employed instead of the hitherto customary locking rings, the rings are preferably open at the places where there is a break or change in the pitch. On the other hand, if the contrivance is used in combination with known locking rings, an opening of this kind in the two rings is not necessary.

If the contrivance is to be used on shafts or the like, the two rings can be provided in their outer edges with a toothing which through bending of one tooth of one ring into a gap between the teeth of the appertaining ring may serve as locking contrivance. If, on the other hand, the contrivance is used in bores or the like, the two rings may have their inner edges provided with a toothing in the same way. It is advisable to arrange the inner or outer toothing of the two rings in asymmetric fashion on both sides of the opening slot.

It is also possible to devise the rings in such a way that the toothing of one ring differs from that of the appertaining ring, particularly regarding the shape of the teeth and regarding the distance of the teeth from one another, so that practically in every position of the two rings with respect to each other there is always somewhere one tooth of one ring confronting a gap in the toothing of the other ring. In addition to this, the teeth of at least one ring may be slightly inwardly bent in the direction of the appertaining ring.

In a preferred form of construction the depth of the gaps between the teeth of the inner or outer ring increases in the area of the opening slot, that is to say, the gaps are deeper in the area of the largest cross-section of the rings than in the area of their smallest cross-section.

Additional features and advantages of the invention will be understood from a consideration of the following detailed description taken in connection with the accompanying drawings forming a part of this specification and in which several embodiments of the invention have been shown by way of example. However, I wish to say that the invention is not confined to any strict conformity with the showing of the drawings, but may be changed or modified, so long as such changes or modifications mark no material departure from the salient features of the invention as expressed in the appending claims.

In the drawings, in which like parts are referred to by the same reference numerals:

Fig. 1 is a side view of the two rings forming the contrivance of the invention;

Fig. 2 is a top view of a ring having its screw surface either merely roughened (see ring portion on the left), or provided with radially extending grooves (see ring portion on the right);

Fig. 3 is a top view of a non-open ring provided with an outer toothing and with two screw surfaces;

Fig. 4 is a side view of the ring of Fig. 3;

Fig. 5 is a top view of an open ring provided with a partial outer toothing;

Fig. 6 is a top view of an open ring provided with a partial inner toothing;

Fig. 7 is a perspective sectional view, showing a shaft bearing provided with the contrivance;

Fig. 8 is a fractional detail view, showing a tooth of one ring bent into a gap between the teeth of the appertaining ring.

In the embodiments illustrated in the drawings the two rings forming the contrivance have been denoted by the reference numerals 1 and 2. The two rings 1 and 2 rest flatly against each other and are provided on their confronting sides with oppositely directed screw surfaces 3. Through turning of one ring with respect to the other ring the total thickness or width of the two rings is changed. If, for example, the rings are turned in ascending direction of the screw surfaces, the rings are forced into wedge-like engagement, whereby the total thickness or width of the two rings is increased.

If the contrivance illustrated in Fig. 7 is employed instead of the customary locking rings, it is merely necessary to widen the annular groove 4 of the shaft 5, which is to receive the two rings 1 and 2, in axial direction to such an extent that its width corresponds to at least the total width of the two rings 1 and 2. In a construction like this the rings 1 and 2 bear, on the one hand, against the outer shaft surface of the groove 4 and, on the other hand, against the machine part to be secured in position, whereby the machine part consists in this case of a roller bearing 6. The axial play of the shaft 5 can be adjusted to requirements through turning of the rings 1 or 2, while simultaneously the shaft 5 and the roller bearing 6 are secured in position.

The construction may also be modified in such a way that the two rings are used in addition to a locking ring of the known type. In the latter case the two rings forming the contrivance of the invention are seated on the shaft 5 next to the roller bearing 6, while the locking ring is arranged in the circular groove 4 of the shaft. In a construction of this type it is not necessary for the two rings 1 and 2 to be open. These bear, when the axial play has been adjusted, on the one hand, against the locking ring and, on the other hand, against the roller bearing 6.

In order to prevent automatic turning of the rings, as a result of shocks or friction, so that the adjusted axial play undergoes changes, the confronting screw surfaces of the two rings may either be merely unpolished (see Fig. 2—half on the left), or be roughened or provided with radially extending grooves (see Fig. 2—half on the right).

However, a roughened or grooved surface will frequently not suffice to secure the slanting surfaces of the two rings in locked-up condition. That is why the two rings, when used on shafts or the like, may be provided with an outer toothing, as shown in Fig. 3. This toothing is so devised that the crest of the individual teeth is always of narrower width than the open spaces or gaps between them, so that it is possible, after the two rings have been adjusted in position, to bend one or a plurality of teeth 7 into the open spaces or gaps 8 positioned behind them of the appertaining ring, as shown in Fig. 8.

The teeth 7 of at least one of the two rings 1 or 2 may be slightly inwardly bent in the direction of the appertaining ring, so that the teeth 7 of the adjusted rings are in mesh with each other.

Instead of providing the two rings 1 and 2 with an outer toothing, as shown in Fig. 3, it is also possible to provide them with an inner toothing if they are to be used in bores or the like.

In the form of construction shown in Fig. 5 the ring is partly provided with an outer toothing, while a ring provided with a partial inner toothing is illustrated in Fig. 6.

The inner or outer toothing of the two rings may be asymmetrically arranged on both sides of their opening slot 9, for example in such manner that on one side of the rings teeth with a wider crest are provided than on the other side, or in such a way, that the open spaces between the teeth are differently sized. It is further possible to devise the rings in such manner that the toothing of one of the rings differs from that of the appertaining ring regarding the size of the crests and regarding the distances between the teeth, so that regardless of the position of the rings with respect to each other there always confronts a tooth of one ring a gap between the teeth of the appertaining ring and thus permits the bending of the tooth into the respective gap.

In order to obtain, if possible, a slightly ascending pitch for the screw surfaces of both of the rings, it is advisable to provide the rings with only one continuous screw surface. However, under certain circumstances it may be advisable to increase the steepness of the pitch. In cases like that the screw surfaces of the two rings may be subdivided into portions of ascending pitch. It is possible, for example, to provide each of the rings (Figs. 3 and 4) with two or more screw surfaces, and accordingly also with two or more breaks of pitches.

The depth of the gaps 8 is largest, particularly in consideration of the springiness of the rings, in the vicinity of their opening slots 9 and gradually decreases in the direction toward the opposite side of the rings. Furthermore, the depth of the gaps 8 is larger in the area of the largest ring cross-section than in the area of the smallest ring cross-section, that is to say, the depth of the gaps is devised in proportion to the ring cross-section.

What I claim as new and desire to secure by Letters Patent of the United States is:

1. Device for limiting the axial play of shafts and for locking machine parts on a shaft, the shaft being provided with an annular groove, the device comprising a pair of rings received in a side by side relationship in the annular groove and being provided with cam surfaces for mutual engagement and axial adjustment, each ring being provided with teeth and intervening gaps, the teeth extending radially substantially in the plane of the ring, at least one of the teeth of one of the rings being bent in axial direction to enter a gap between two teeth of the other ring.

2. In the device according to claim 1, the teeth being provided on the outside of the rings.

3. In the device according to claim 1, the teeth being provided on the inside of the rings.

4. In the device according to claim 1, each ring having a cutout in radial direction, the teeth extending in two series away from the cutout, the series being different in number of teeth.

5. In the device according to claim 1, the teeth being provided on the outside of the rings, each ring having a cutout in radial direction, the teeth extending in two series away from the cutout, the depth of the gaps between the teeth of an individual series being nonuniform, the gaps having the greatest depth in the vicinity of the cutout.

6. In the device according to claim 1, the teeth being provided on the inside of the rings, each ring having a cutout in radial direction, the teeth extending in two series away from the cutout, the depth of the gaps between the teeth of an individual series being nonuniform, the gaps having the greatest depth in the area of the largest cross section.

7. In the device according to claim 1, with the teeth being provided on the outside of the rings, the teeth of one ring differing from those of the other ring as to the width of the teeth and the width of the gaps.

8. In the device according to claim 1, with the teeth being provided on the outside of the rings, the teeth of one of the rings being slightly bent toward the other ring.

9. In the device according to claim 1, the cam surface of each of the rings being offset at least once.

10. In the device according to claim 9, each of the rings being provided with a radially extending cutout between the offset portions of the cam surface.

References Cited in the file of this patent

UNITED STATES PATENTS

| | | |
|---|---|---|
| 910,712 | McCoy | Jan. 26, 1909 |
| 1,966,780 | Wyrick | July 17, 1934 |
| 2,004,263 | Wyrick | June 11, 1935 |
| 2,131,948 | Graham | Oct. 4, 1938 |
| 2,405,889 | Kennedy | Aug. 13, 1946 |
| 2,551,503 | Needham | May 1, 1951 |